Feb. 28, 1933.   H. A. ROTHCHILD ET AL   1,899,774
METHOD OF AND APPARATUS FOR TESTING LOADING
MATERIAL USED IN PAPER MANUFACTURE
Filed Oct. 25, 1929   3 Sheets-Sheet 2
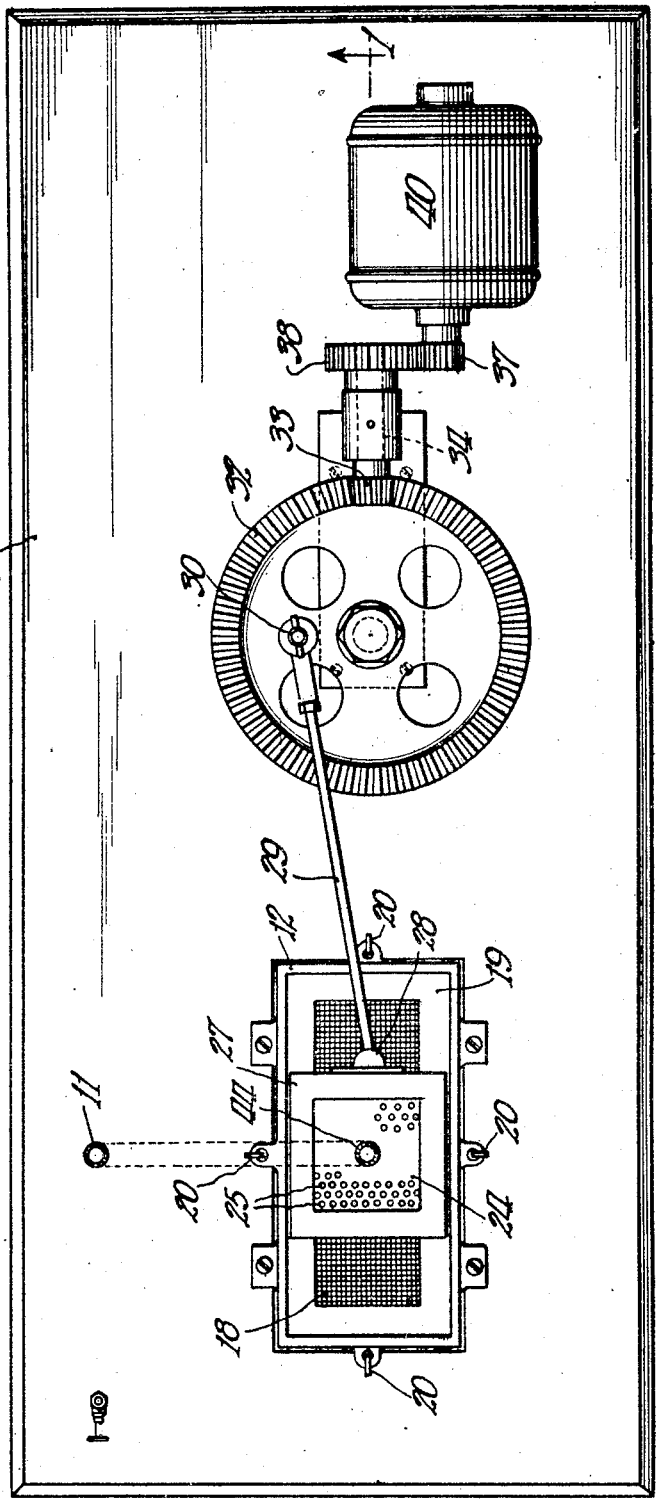
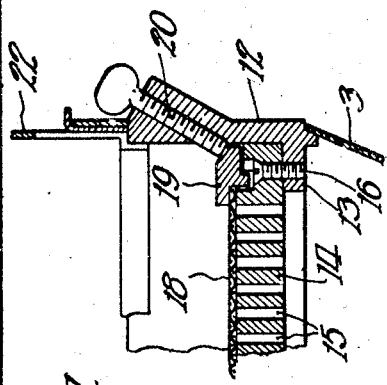
Inventors.
Henry A. Rothchild
John A. Limpert
By Fisher, Clapp, Soans and Pond Attys.

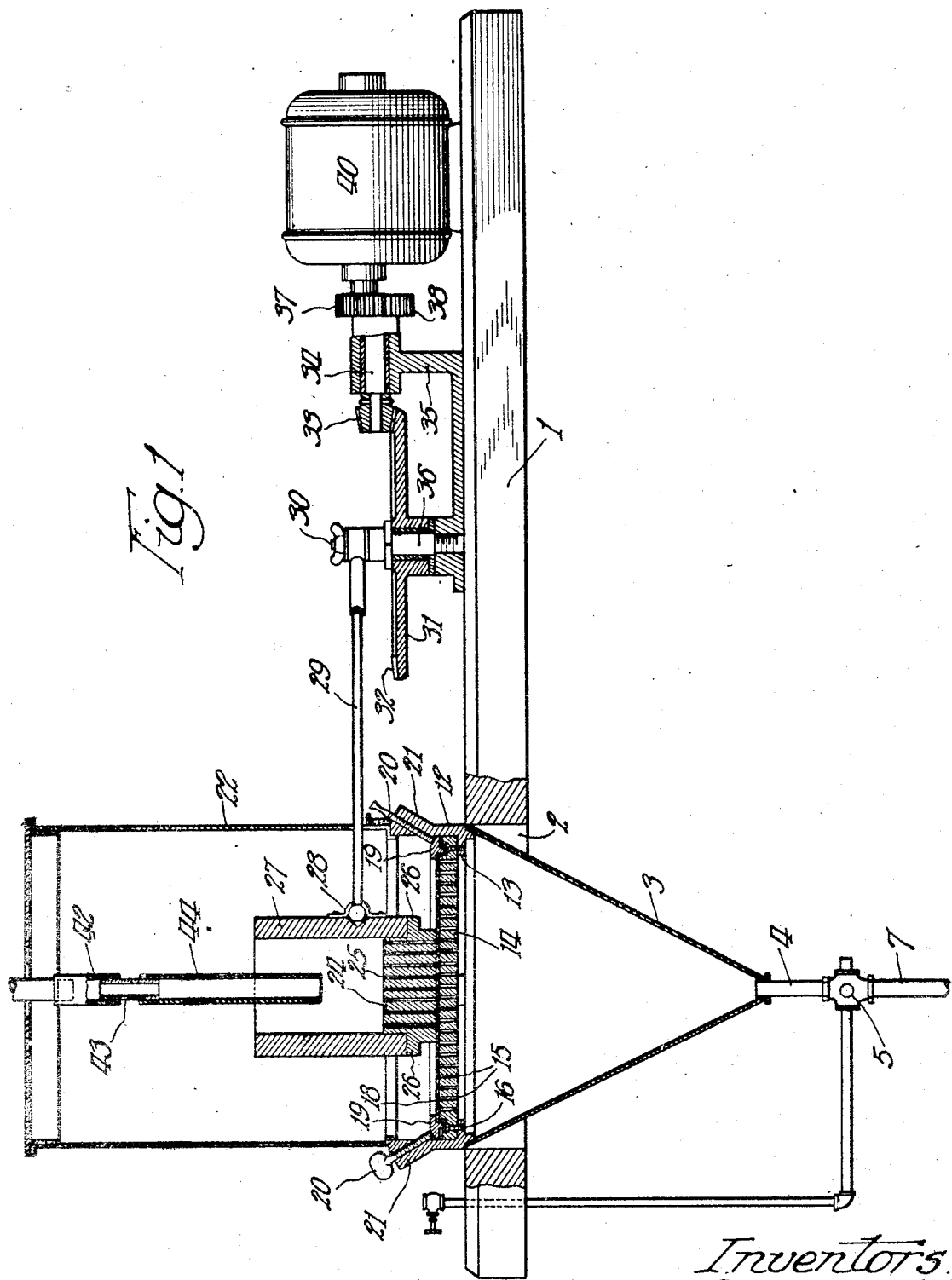

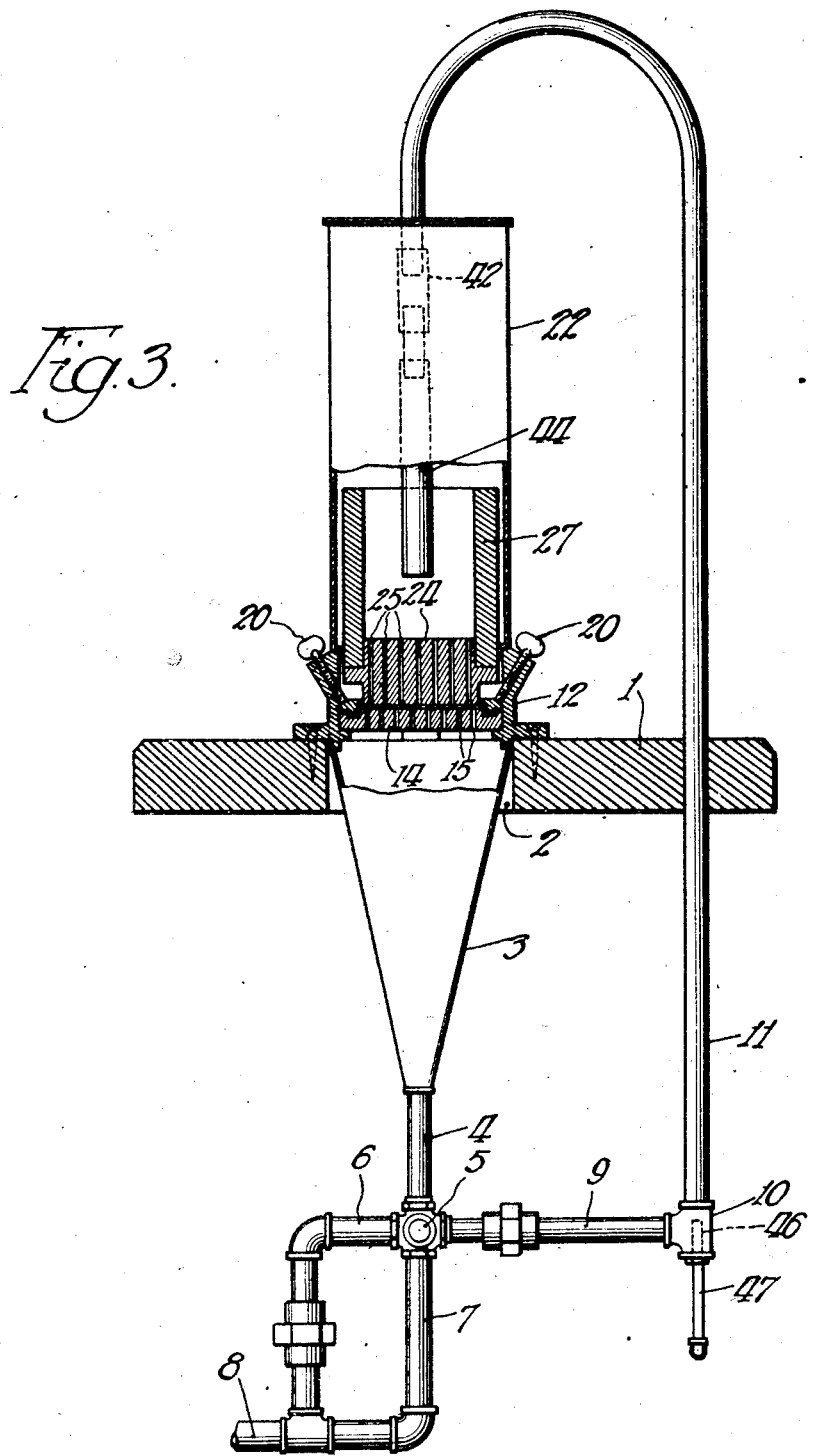

Patented Feb. 28, 1933

1,899,774

UNITED STATES PATENT OFFICE

HENRY A. ROTHCHILD, OF APPLETON, AND JOHN A. LIMPERT, OF KIMBERLY, WISCONSIN, ASSIGNORS TO PAPER PATENTS COMPANY, OF NEENAH, WISCONSIN, A CORPORATION OF WISCONSIN

METHOD OF AND APPARATUS FOR TESTING LOADING MATERIAL USED IN PAPER MANUFACTURE

Application filed October 25, 1929. Serial No. 402,365.

In the manufacture of paper, certain materials are used which, although they impart desirable properties to the paper, are commonly known in the trade as "loading" material. This classification includes clay, calcium sulphate, chalk and other more or less inert materials, the function of which is well understood by those familiar with the paper making art. Various methods have heretofore been used for testing this loading material in order to determine its properties and characteristics, as these have a material bearing upon the value and efficiency of the material.

It is highly important to ascertain the characteristics of the gritty matter in the loading material, since, if this gritty material is of such shape and sharpness or has such cutting ability as to speedily erode or wear away the parts of the paper-making machine exposed thereto, its efficiency and usefulness as loading material is seriously impaired. Thus, when a web of paper containing loading material passes on to the Fourdrinier screen or wire of the paper-making machine, some of the loading material contained in the paper web will sift or wash through the screen or wire and on to the tube rolls, on to and through the suction boxes. There is a friction of rolling and sliding between the screen or wire and the tube rolls, and between the wire and the suction boxes; and when the loading material which passes through the screen and wire is sharp or of a cutting or eroding nature, its wearing action on the screen or wire, the suction box covers, the tube rolls, and other parts of the machine, is considerable. Thus, for example, the life of the Fourdrinier screen or wire of a paper-making machine may easily be reduced 25%, and in some instances as much as 75%, of its normal, when the gritty particles of the loading material are sharp, cutting, or highly erosive.

The object of the present invention is to provide a method and apparatus whereby the erosive properties of the loading material may be tested, so that such materials may be used as are least injurious to the life of the screen or wire and other parts of a paper-making machine. To this end, our invention consists in the features of novelty hereinafter described, with the aid of the accompanying drawings, and particularly pointed out in the claims at the end of this specification.

Figure 1 is a view in vertical longitudinal section on line 1—1 of Figure 2 of a testing machine embodying my invention.

Figure 2 is a plan view.

Figure 3 is a view in end elevation, parts being shown in section on line 3—3 of Figure 2.

Figure 4 is an enlarged detail view in vertical section through the means employed for clamping in place a section of wire screen used in the testing operation.

The preferred apparatus used in carrying out this invention is shown as comprising a suitable bed or support 1, in an opening 2 of which is mounted a pan drip or receptacle 3, having at its bottom a discharge pipe 4 that is connected by a suitable valve (preferably, a 4-way valve 5) with branch pipes 6 and 7 communicating with a pipe 8 that may lead to the sewer. The casing of the valve 5 is also connected by a pipe 9 with a coupling 10 united to the lower end of the supply or air lift pipe 11. Above the pan drip 3 is mounted an open frame or box 12, at the bottom of which is formed an inwardly extending flange 13 on which rests a support 14 that is formed with perforations 15 extending vertically therethrough. The support 14 is held in position by screws 16 passing through the support and through the flange 13 of the box or frame 12. The support 14 is adapted to sustain a plate 18, which, as shown, is a section of a Fourdrinier wire or screen having numerous openings therethrough. This screen section 18 is held in place upon the support 14 by means of a frame 19 that clamps the edges of the screen section 18 and is held in firm engagement therewith by means of thumb screws 20 that pass through threaded openings in the parts 21 of the box or frame 12. Preferably, there is mounted above the box frame 12 a splash can 22 having an opening in its top and an opening in one of its sides for a purpose to be presently stated.

Above the support 14 and adapted to rest upon the screen section 18 carried thereby, is a block or body 24 having channels 25 extending therethrough, this block or body 24 being shown as formed with a flange 26 whereon rests the lower end of a chambered block or casing 27 into which the upper part of the body or block 24 extends.

In order to impart movement to the body or block 24 (which is preferably of wood) and to the chambered block or casing 27, the mechanism next described is preferably employed: To one side of the block or casing 27 is united as at 28, and preferably by a ball-and-socket joint, the inner end of a pitman rod 29, the outer end of which is suitably connected with a stud 30 that rises eccentrically from the top of the gear wheel 31. This gear wheel 31 has teeth 32 around the upper side of its periphery to engage with a bevel pinion 33 carried by a shaft 34 that is suitably journaled in a frame or support 35 fixed to the bed or support 1. From the inner end of the frame 35 rises the axle 36 on which the gear wheel 31 is revolubly mounted. As shown, the shaft 34 carries at its outer end a pinion 37 that meshes with a pinion 38 on the shaft of an electric motor 40. The pitman 29 passes through a long slot or opening formed adjacent the bottom of the splash can 22.

Through an opening in the top of the splash can 22 extends the curved upper part of the supply or air lift pipe 11. (See Figures 1 and 3.) Preferably, the part of the pipe 11 within the splash can 22 is fitted with a section 42 of rubber tubing that joins the short pipe section 43 (that may be of glass) to the lower end of which is connected a rubber tube section 44 that extends down into the chambered block or casing 27.

Into the lower end of the coupling 10 at the bottom of the supply or air lift pipe 11 extends the air nozzle 46 of the air supply pipe 47 that will be connected with suitable means for supplying air under pressure to effect the circulation of liquid from the pan drip or receptacle 3, through the discharge pipe 4, branch pipe 9, and supply or air lift pipe 11 to the chambered block or casing 27 within the splash can 22.

The operation of the above-described apparatus is as follows: Assuming that air has been admitted under pressure to the supply or air lift pipe 11, and that the electric motor 40 has been started, it will be seen that a circulation of the volume of liquid containing the loading material in suspension will be caused to occur from the pan drip or receptacle 3, through the discharge pipe 4, branch pipe 9 and supply or air lift pipe 11 to the chambered block or casing 27, and thence through the perforated body or block 24 and through the screen section 18 and its support 14. At the same time, a reciprocating movement of the body or block 24 and casing 27 over and in rubbing contact with the screen 18 will be effected by the electric motor and the mechanism connecting it with the chambered block or casing 27. Hence, the rubbing surfaces of contact of the block or body 24 and the screen section 18 will be continuously wetted with the liquid carrying the loading material in suspension. The movement of the body or block 24 and the circulation of the liquid through this block or body, the screen section and its perforated support, will be continued for a definite length of time, after which, the screen section 18 (which has been weighed prior to the beginning of the operation) will be removed, and this section will be again weighed in order to determine its loss in weight due to its exposure to the rubbing action and to the circulation of the volume of liquid containing the loading material. The greater the loss in weight of the screen section 18, the less suitable will be the loading material for use in paper manufacture, since a large loss in weight indicates that the loading material is so sharp, erosive and cutting as to seriously injure the parts of the paper-making machine, and particularly the wire or screen, exposed to the abrasive action of the loading material. It will be understood, of course, that when the screen section 18 is to be removed, the splash can 22 will be lifted off, the chambered casing 27 and body or block 24 will be moved from above the screen 18, and the thumb screws 20 will be loosened so as to permit the frame 19 and the screen 18 to be removed.

By means of the 4-way valve 5, the liquid may be readily drained from the pan or receptacle 3 and from the supply pipe 11.

In practice, the above-described method of testing loading material used in paper manufacture has proved highly efficient. The details of such method and of the apparatus may be varied within wide limits without departing from the scope of the invention which is set forth in the appended claims.

Having thus described our invention, what we claim as new and desire to secure by Letters Patent is:

1. The method of testing loading material for use in paper manufacture that consists in exposing a body of predetermined weight to the frictional or wearing action of the loading material for a definite period, maintaining relative movement between said body and another body in frictional relation thereto and between which bodies the loading material circulates, and thereafter weighing said first body to ascertain the percentage of loss in weight due to said exposure.

2. The method of testing loading material for use in paper manufacture that consists in exposing a body of predetermined weight to the frictional or wearing action of a volume of liquid containing the loading material in suspension, maintaining a relative movement between said body and another body in frictional relation thereto and between which bodies the loading material circulates for a definite period, and thereafter weighing said first body to ascertain the percentage of loss in weight due to said exposure.

3. The method of testing loading material for use in paper manufacture that consists in exposing a body of predetermined weight to the frictional or wearing action of a volume of liquid containing the loading material in suspension, maintaining the circulation of said liquid in contact with said body for a definite period and maintaining a relative movement between said body and another body in frictional relation thereto and between which bodies the loading material circulates, and thereafter weighing said first-mentioned body to ascertain the percentage of loss in weight due to said exposure.

4. The method of testing loading material for use in paper manufacture that consists in exposing a section of Fourdrinier screen of predetermined weight to the frictional or wearing action of a volume of liquid containing loading material in suspension, circulating said liquid through said screen for a definite period, and thereafter weighing said screen section to ascertain the percentage of loss in weight due to said exposure.

5. The method of testing loading material for use in paper manufacture that consists in exposing a section of Fourdrinier screen of predetermined weight to the frictional or wearing action of a volume of liquid containing the loading material in suspension, circulating said liquid through said screen and maintaining a relative movement between said screen and a body in frictional relation thereto for a definite period, and thereafter weighing said screen section to ascertain the percentage of loss in weight due to said exposure.

6. An apparatus for testing loading material for use in paper manufacture, comprising the combination of a tank, means for maintaining a flow of liquid through said tank, means for holding a body exposed to the liquid in said tank, a second body in said tank, and means for maintaining a relative movement in frictional relation between said bodies in the tank.

7. An apparatus for testing loading material for use in paper manufacture, comprising the combination of a tank, means for maintaining a return circulation of liquid within and through said tank, means for holding a body exposed to the liquid in said tank, a second body within said tank, and means for moving one of said bodies in frictional contact with the other.

8. An apparatus for testing loading material for use in paper manufacture, comprising the combination of a tank, a support adapted to receive a sheet and arranged transversely of said tank, a body mounted adjacent said support and means for moving said body in frictional relation with the sheet on said support.

9. An apparatus for testing loading material for use in paper manufacture, comprising the combination of a tank, means for maintaining a flow of liquid through said tank, a perforated support arranged within said tank and adapted to hold a sheet, a body mounted adjacent to said support, and means for effecting a relative movement in frictional relation between said body and the sheet carried by said support.

10. An apparatus for testing loading material for use in paper manufacture, comprising the combination of a tank, a perforated sheet support arranged transversely of said tank, a perforated body within said tank adjacent said sheet support, means for effecting a relative movement between said support and said body, and means for maintaining a flow of liquid through said support and body.

11. An apparatus for testing loading material for use in paper manufacture, comprising the combination of a tank, a perforated sheet support arranged transversely of said tank, a perforated body arranged above said sheet support, means for imparting reciprocating movement to said perforated body, and means for effecting a circulation of liquid in said tank and through said perforated support and body.

12. An apparatus for testing loading material for use in paper manufacture, comprising the combination of a tank, a perforated support mounted within said tank, means for clamping a sheet upon said support, a perforated body mounted above said sheet support, and means for imparting movement to said body.

13. An apparatus for testing loading material for use in paper manufacture, comprising the combination of a tank having a discharge pipe at its bottom, a pipe for delivering liquid to the top of said tank, a pipe connecting the lower part of said delivery pipe with said discharge pipe, means for causing the return flow of liquid through said tank and pipes, a perforated sheet support arranged transversely of said tank, a perforated body arranged within said tank adjacent said sheet support, and means for imparting movement to said perforated body.

14. An apparatus for testing loading material for use in paper manufacture, comprising the combination of a tank, a sheet support arranged transversely of said tank, a perforated body arranged above said sheet support, a chambered block above and connected to said perforated body, means for imparting movement to said block and body, and a pipe for delivering liquid into said chambered block.

HENRY A. ROTHCHILD.
JOHN A. LIMPERT.